(12) United States Patent  (10) Patent No.: US 9,317,957 B2
Okada et al.  (45) Date of Patent: Apr. 19, 2016

(54) ENHANCEMENT OF STEREOSCOPIC EFFECT OF AN IMAGE THROUGH USE OF MODIFIED DEPTH INFORMATION

(71) Applicant: Sony Corporation, Tokyo (JP)

(72) Inventors: Shintaro Okada, Tokyo (JP); Takahiro Nagano, Kanagawa (JP); Kenichiro Hosokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 13/744,508

(22) Filed: Jan. 18, 2013

(65) Prior Publication Data

US 2013/0195347 A1  Aug. 1, 2013

(30) Foreign Application Priority Data

Jan. 26, 2012  (JP) ................................ 2012-014488

(51) Int. Cl.
*G06T 15/00*  (2011.01)
*H04N 13/00*  (2006.01)

(52) U.S. Cl.
CPC ............ *G06T 15/00* (2013.01); *H04N 13/0018* (2013.01); *H04N 13/0022* (2013.01)

(58) Field of Classification Search
None
See application file for complete search history.

(56) References Cited

U.S. PATENT DOCUMENTS

| 2009/0116732 | A1* | 5/2009 | Zhou et al. ..................... 382/154 |
| 2011/0242280 | A1* | 10/2011 | Mishima et al. ................ 348/46 |
| 2011/0317766 | A1* | 12/2011 | Lim et al. .................. 375/240.16 |
| 2012/0026289 | A1* | 2/2012 | Suenaga et al. ................ 348/44 |

FOREIGN PATENT DOCUMENTS

| JP | 10-126708 A | 5/1998 |
| JP | 10-191397 A | 7/1998 |
| JP | 11-008862 A | 1/1999 |
| JP | 11-127456 A | 5/1999 |
| JP | 2000-092516 A | 3/2000 |
| JP | 2001-157229 A | 6/2001 |
| JP | 2003-032703 A | 1/2003 |
| JP | 2004-200784 A | 7/2004 |
| JP | 2005-151534 A | 6/2005 |
| JP | 2006-186510 A | 7/2006 |
| JP | 2006-186511 A | 7/2006 |
| JP | 2007-264722 A | 10/2007 |
| JP | 2008-004085 A | 1/2008 |
| JP | 2009-044722 A | 2/2009 |
| JP | 2009-053748 A | 3/2009 |
| JP | 2010-154422 A | 7/2010 |
| JP | 2010-206362 A | 9/2010 |
| JP | 2011-113363 A | 6/2011 |
| JP | 2011-216076 A | 10/2011 |
| JP | 2011-223284 A | 11/2011 |
| WO | WO 2010/113859 | * 10/2010 |

OTHER PUBLICATIONS

Japanese Office Action issued on Aug. 4, 2015 in patent application No. 2012014488.

* cited by examiner

*Primary Examiner* — Siamak Harandi
(74) *Attorney, Agent, or Firm* — Sony Corporation

(57) ABSTRACT

An image processing apparatus includes a modifying unit configured to modify depth information representing depths in individual pixels of an image in accordance with content included in the image, thereby generating modified depth information, and an enhancing unit configured to perform a stereoscopic effect enhancement process of enhancing a stereoscopic effect of the image by using the modified depth information generated by the modifying unit.

15 Claims, 14 Drawing Sheets

FIG. 5
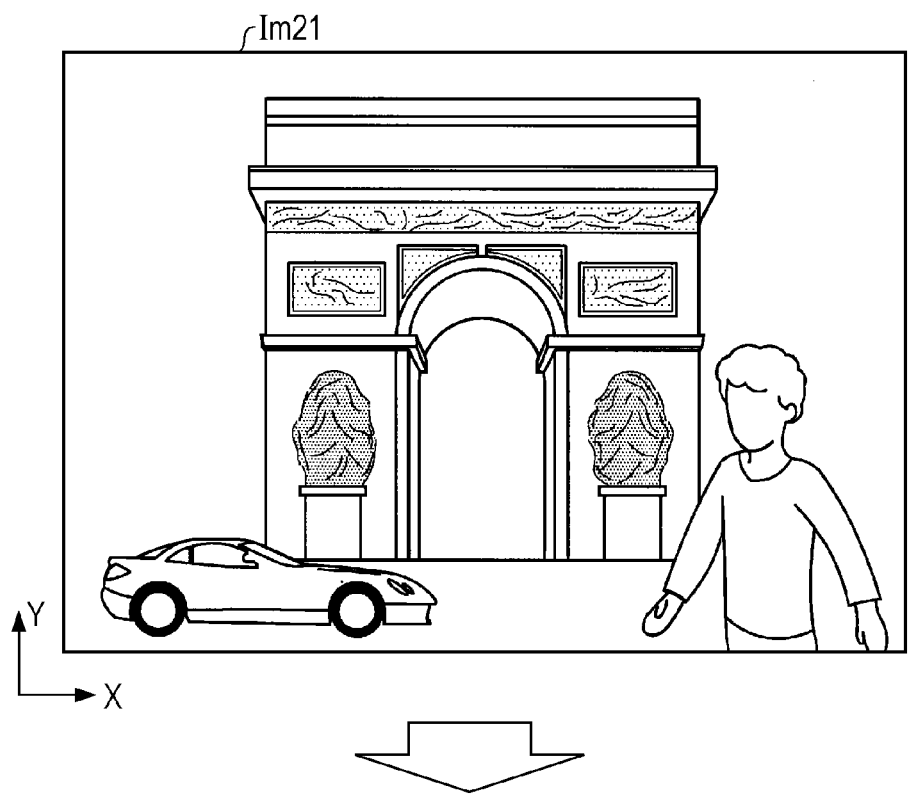
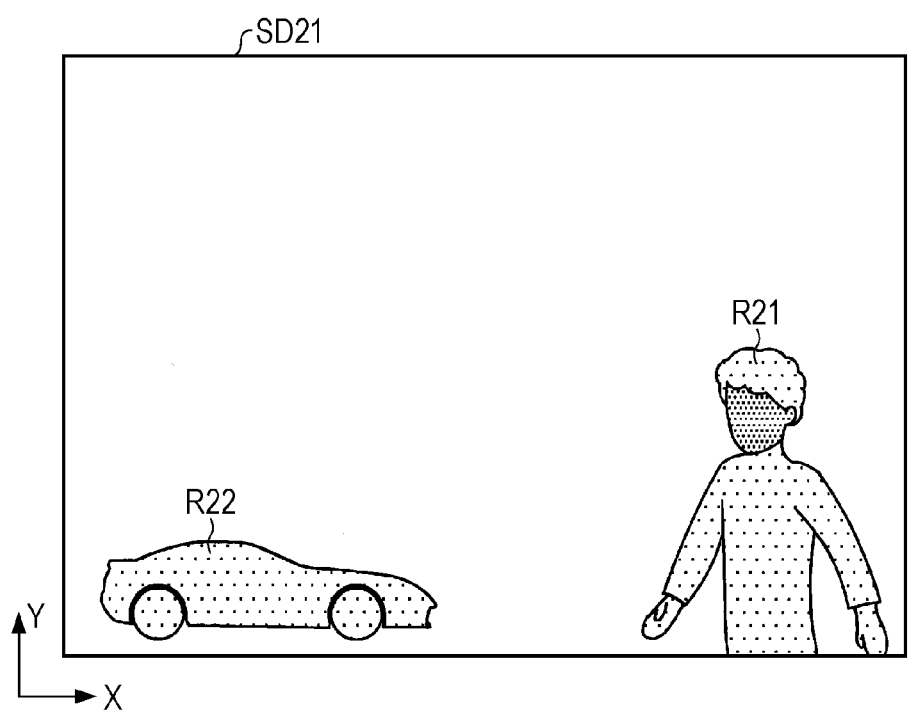

ENHANCEMENT OF STEREOSCOPIC EFFECT OF AN IMAGE THROUGH USE OF MODIFIED DEPTH INFORMATION

BACKGROUND

The present disclosure relates to an image processing apparatus and an image processing method.

Some methods for enhancing a stereoscopic effect of a two-dimensional image in a pseudo manner have been suggested. These methods are directed to increasing subjective image quality of various types of image content, such as photographs, movies, and television images. For example, Japanese Unexamined Patent Application Publication No. 10-126708 suggests a technique of dividing an image into a background region and a foreground region by using a second-order differential of an image signal and performing edge enhancement with different levels on these regions. Japanese Unexamined Patent Application Publication No. 2010-206362 suggests a technique of dividing an image into a background region and a foreground region by using a stereoscopic method and adding shade to an object in the foreground region.

SUMMARY

In both of the above-described existing methods, content of an image is not taken into consideration. A stereoscopic effect experienced by a user may vary depending on factors related to content of an image, for example, whether an outdoor scene or an indoor scene appears in an image, or whether a person or a cityscape appears in an image.

In order to enhance a stereoscopic effect of image content and effectively increase subjective image quality, it is desirable to determine a subject of an image and control an enhancement process in accordance with the determination result.

According to an embodiment of the present disclosure, there is provided an image processing apparatus including a modifying unit configured to modify depth information representing depths in individual pixels of an image in accordance with content included in the image, thereby generating modified depth information, and an enhancing unit configured to perform a stereoscopic effect enhancement process of enhancing a stereoscopic effect of the image by using the modified depth information generated by the modifying unit.

According to an embodiment of the present disclosure, there is provided an image processing method including modifying depth information representing depths in individual pixels of an image in accordance with content included in the image, thereby generating modified depth information, and performing a stereoscopic effect enhancement process of enhancing a stereoscopic effect of the image by using the modified depth information.

According to an embodiment of the present disclosure, there is provided an image processing apparatus including an image obtaining unit configured to obtain a target image to be processed, a transmitting unit configured to transmit the target image to another image processing apparatus which obtains depth information representing depths in individual pixels of an image, determines content included in the image, modifies the depth information in accordance with a determination result about the content to generate modified depth information, and performs a stereoscopic effect enhancement process of enhancing a stereoscopic effect of the image by using the modified depth information, and a receiving unit configured to receive, from the other image processing apparatus, the target image having a stereoscopic effect enhanced by the other image processing apparatus.

According to an embodiment of the present disclosure, there is provided an image processing method including obtaining a target image to be processed, transmitting the target image to an image processing apparatus which obtains depth information representing depths in individual pixels of an image, determines content included in the image, modifies the depth information in accordance with a determination result about the content to generate modified depth information, and performs a stereoscopic effect enhancement process of enhancing a stereoscopic effect of the image by using the modified depth information, and receiving, from the image processing apparatus, the target image having a stereoscopic effect enhanced by the image processing apparatus.

With the technology according to the present disclosure, subjective image quality can be effectively increased in accordance with content included in an image.

BRIEF DESCRIPTION OF THE DRAWINGS

FIG. 5 is an explanatory diagram describing modification of depth information using a determination result about a region;

DETAILED DESCRIPTION OF EMBODIMENTS

Figure 1:
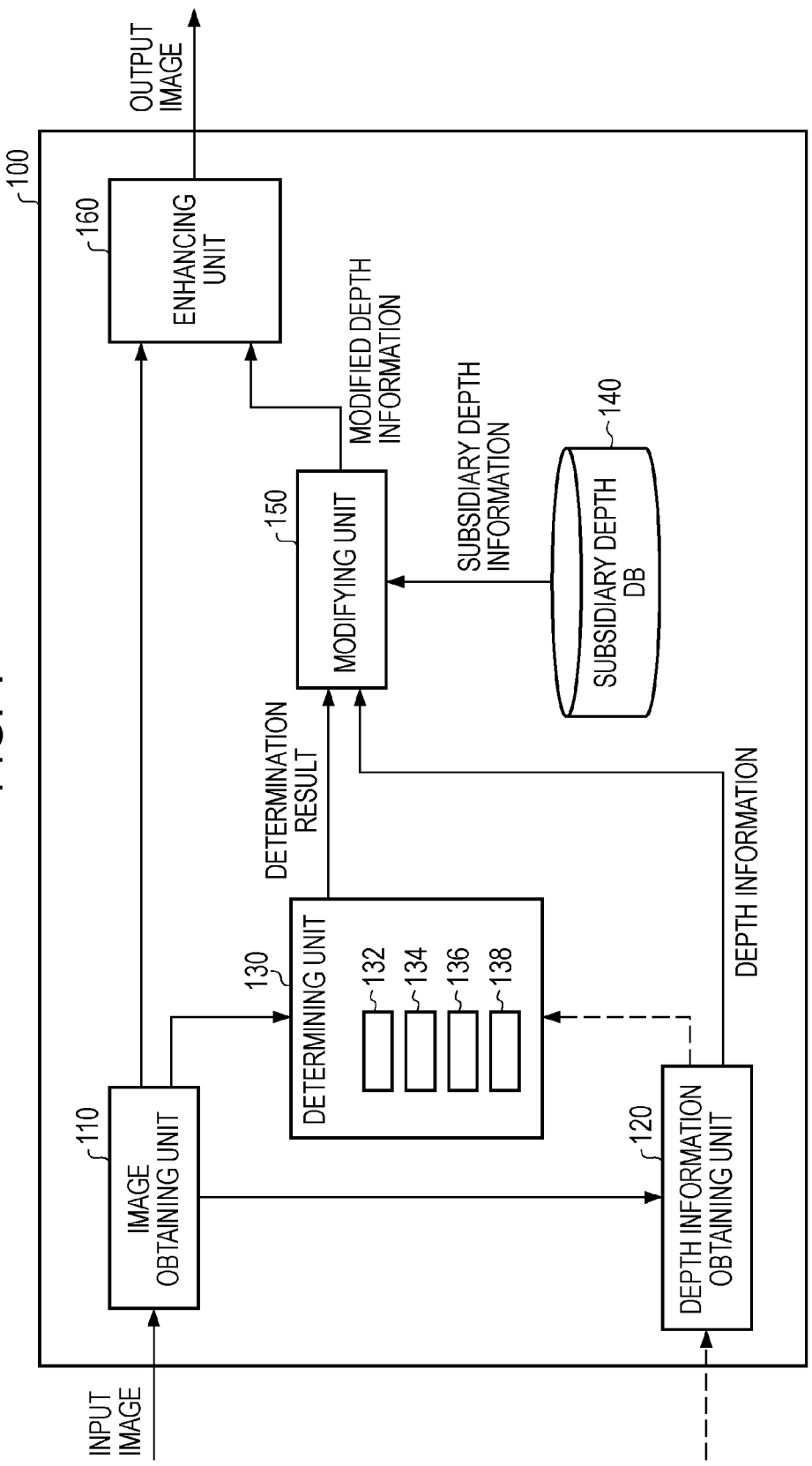
FIG. 1 is a block diagram illustrating an example of a configuration of an image processing apparatus according to a first embodiment.

Hereinafter, embodiments of the present disclosure will be described in detail with reference to the attached drawings. In the specification and drawings, elements having substantially the same functional configuration are denoted by the same reference numerals, and a redundant description is omitted. The description will be given in the following order.

1. First embodiment
   1-1. Image obtaining unit
   1-2. Depth information obtaining unit
   1-3. Determining unit
   1-4. Subsidiary depth DB
   1-5. Modifying unit
   1-6. Enhancing unit
   1-7. Flow of process
2. Second embodiment
3. Learning of filter coefficients
4. Application examples
5. Conclusion

1. First Embodiment

First, a first embodiment of a technology according to the present disclosure will be described with reference to FIGS. 1 to 8. An image processing apparatus 100 according to the first embodiment obtains an input image, performs a stereoscopic effect enhancement process on the obtained input image, and generates an output image. The input image may be a still image or may be each frame constituting a moving image. The output image may be displayed on a display, or may be stored in a storage medium. The image processing apparatus 100 may be any type of apparatus, for example, a television apparatus, a personal computer (PC), a smart phone, a content recorder, a content player, a digital still camera, or a digital video camera. Alternatively, the image processing apparatus 100 may be an image processing module mounted on such an apparatus.

FIG. 1 is a block diagram illustrating an example of a configuration of the image processing apparatus 100 according to the first embodiment. Referring to FIG. 1, the image processing apparatus 100 includes an image obtaining unit 110, a depth information obtaining unit 120, a determining unit 130, a subsidiary depth database (DB) 140, a modifying unit 150, and an enhancing unit 160.

1-1. Image Obtaining Unit

The image obtaining unit 110 obtains an input image. The input image obtained by the image obtaining unit 110 may be, for example, an image captured by a camera module including an image capture device, such as a charge-coupled device (CCD) or a complementary metal oxide semiconductor (CMOS) sensor. Alternatively, the input image obtained by the image obtaining unit 110 may be an image stored in a storage medium or an image received from an external data source. The image obtaining unit 110 outputs the obtained input image to the depth information obtaining unit 120, the determining unit 130, and the enhancing unit 160.

1-2. Depth Information Obtaining Unit

The depth information obtaining unit 120 obtains depth information representing depths in individual pixels of an input image. The depth information can be represented in the form of a so-called depth map. The depth information obtaining unit 120 may generate depth information by applying an analysis technology according to the related art to an input image. For example, the depth information obtaining unit 120 performs frequency conversion on an image signal of the input image in a two-dimensional manner (for example, performs discrete Fourier transform or discrete cosine transform), and thereby calculates transform coefficients for frequency components in a high-frequency band to a low-frequency band. The depth information obtaining unit 120 is capable of generating depth information representing a smaller depth for a pixel in which more high-frequency components are detected. When depth information about an input image is provided from another apparatus, the depth information obtaining unit 120 may obtain the provided depth information. The depth information obtaining unit 120 outputs the depth information obtained in this way to the modifying unit 150. In a case where the depth information obtaining unit 120 performs frequency analysis on an input image, the depth information obtaining unit 120 may output a frequency analysis result to the determining unit 130.

1-3. Determining Unit

The determining unit 130 determines the content included in an input image. In this embodiment, the determining unit 130 includes four determining modules: a scene determining module 132, a face determining module 134, an object determining module 136, and an edge determining module 138. Actually, one or some of these modules may be omitted.

The scene determining module 132 determines the type of scene of an input image. In this embodiment, there are four types of scenes: "landscape", "city", "indoor", and "portrait". The scene determining module 132 is capable of determining that the type of scene of an input image is "landscape" when the input image has a smaller amount of high-frequency components and a strong blue or green color. The scene determining module 132 is capable of determining that the type of scene of an input image is "city" when the input image has a characteristic distribution of vanishing points of edges of a subject. The scene determining module 132 is capable of determining that the type of scene of an input image is "indoor" when the input image has a larger amount of high-frequency components and many linear edges. The scene determining module 132 is capable of determining that the type of scene of an input image is "portrait" when the input image has a specific subject (for example, a person) which is focused on. The scene determining module 132 outputs a scene identifier which identifies the type of scene of an input image determined in the above-described manner to the modifying unit 150. The classification of a scene and the method for determining the type of scene used by the scene determining module 132 are not limited to those described above.

The face determining module 134 determines a face region of a person in an input image by using a face region detection technique available in the related art. The face determining module 134 may determine which region in the input image forms a face of a person in accordance with a detection result for a flesh-color region. Alternatively, the face determining module 134 may determine which region in the input image forms a face of a person by comparing an existing face image with a partial image of the input image. Upon detecting a face region in the input image, the face determining module 134 outputs face region information indicating the position of the detected face region to the modifying unit 150.

The object determining module 136 determines a region forming a target object in an input image. In this specification, "target object" is an object for which more precise expression is desired when an image is displayed. The target object may be, for example, a moving object. In this case, the object determining module 136 is capable of determining a moving object in accordance with a difference between a background image or an image of a previous frame and an input image. The target object may be an object to which feature quantity data is given in advance. In this case, the object determining module 136 is capable of determining which region in an input image forms a target object by comparing a feature quantity extracted from the input image and a feature quantity of the target object. Upon detecting a target object in the input image, the object determining module 136 outputs target object information indicating the position of the detected target object to the modifying unit 150.

The edge determining module 138 determines an edge region including main edges in an input image and a texture region forming the other portion. The edge region is a region including so-called structure lines, and includes, for example, a boundary between an object and another object (or background). The edge determining module 138 is capable of detecting edges in an input image by using, for example, an edge detection method available in the related art, and distinguishing edges corresponding to structure lines from the other edges in accordance with a difference in the lengths of the detected edges or texture on both sides of the edges. Then, the edge determining module 138 outputs edge region information indicating the position of the edge region (or texture region information indicting the position of the texture region) to the modifying unit 150.

1-4. Subsidiary Depth DB

Figure 2:
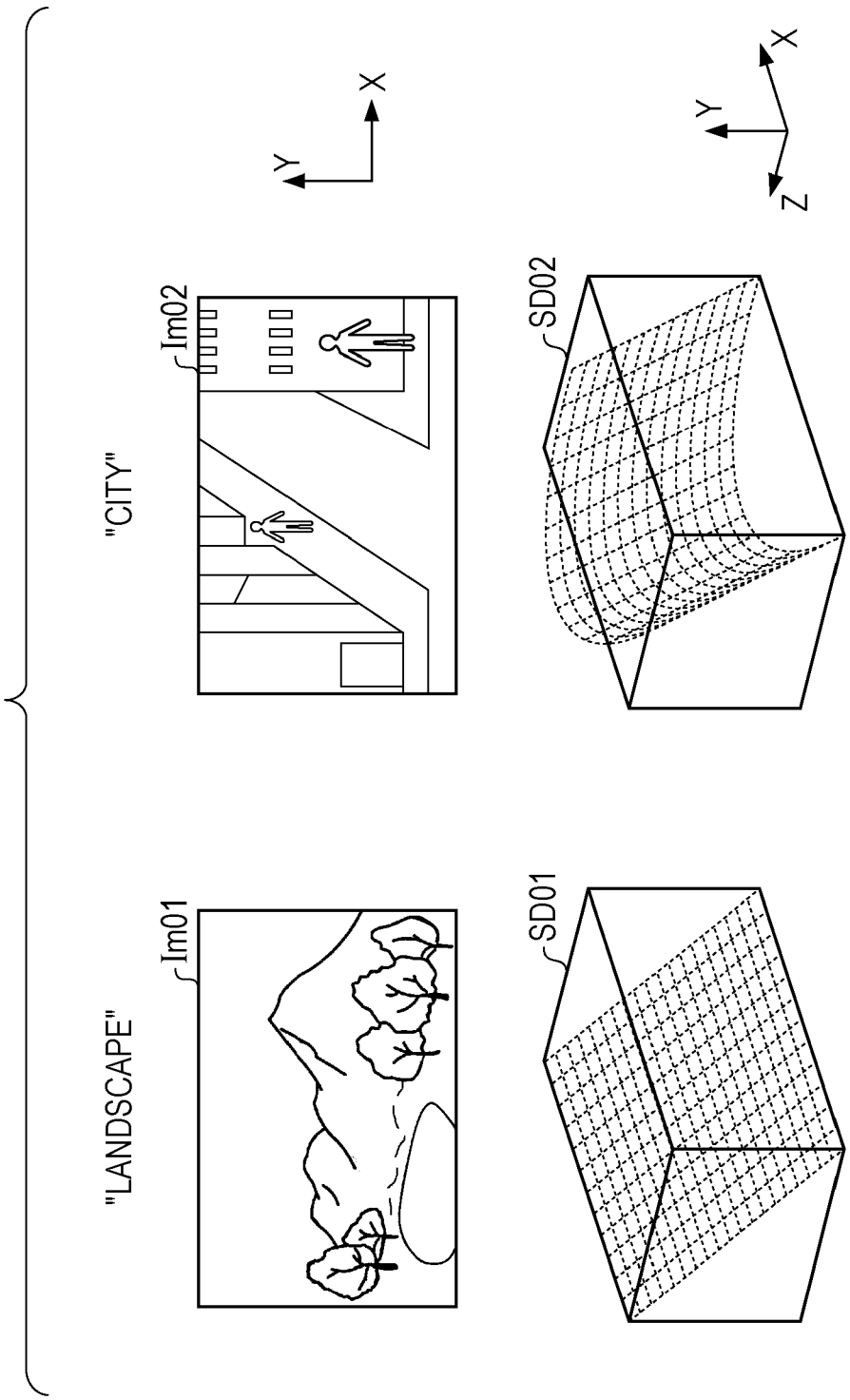
FIG. 2 is a first explanatory diagram describing an example of subsidiary depth information which is defined for each type of scene.
Figure 3:
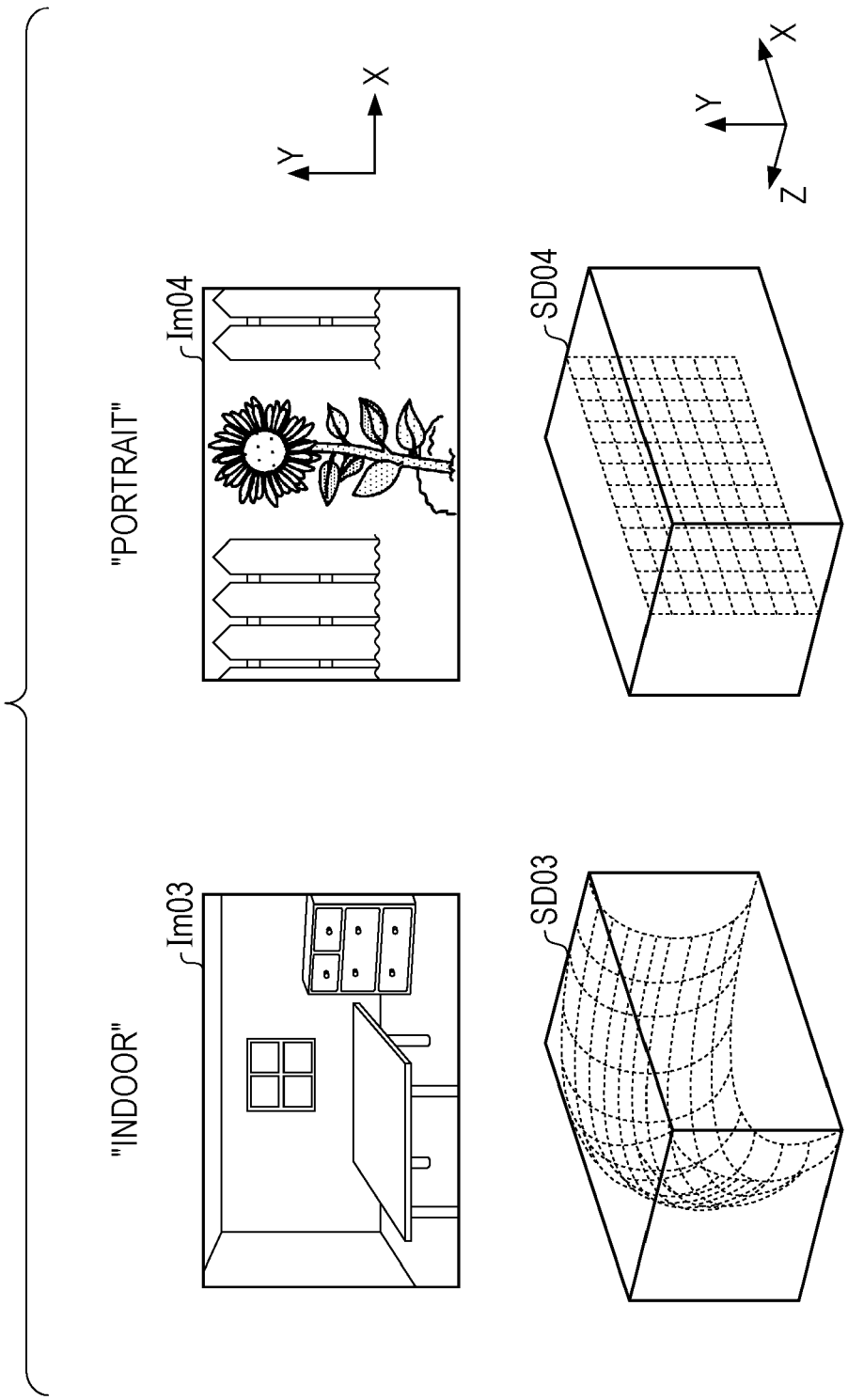
FIG. 3 is a second explanatory diagram describing an example of subsidiary depth information which is defined for each type of scene.

The subsidiary depth DB 140 is a database which stores subsidiary depth information, which is predefined for each type of scene, by using a storage medium. The subsidiary depth information is used to modify basic depth information obtained by the depth information obtaining unit 120, and can be represented in the form of a depth map, like the depth information. FIGS. 2 and 3 are explanatory diagrams describing an example of subsidiary depth information which is defined for each type of scene.

In the upper portion of FIG. 2, an image Im01 and an image Im02 are illustrated. The image Im01 is an example of an image whose type of scene is "landscape", and the image Im02 is an example of an image whose type of scene is "city". In each image, the horizontal axis is an X axis, the vertical axis is a Y axis, and the depth axis is a Z axis. In the lower portion of FIG. 2, subsidiary depth information SD01 which defines "landscape" and subsidiary depth information SD02 which defines "city" are illustrated. The subsidiary depth information SD01 indicates that a pixel located at a higher position has a larger depth. The subsidiary depth information SD02 indicates that a pixel located at a higher position has a larger depth and that a pixel located at the center of the X axis has a larger depth than a pixel located at the ends thereof.

In the upper portion of FIG. 3, an image Im03 and an image Im04 are illustrated. The image Im03 is an example of an image whose type of scene is "indoor", and the image Im04 is an example of an image whose type of scene is "portrait". In the lower portion of FIG. 3, subsidiary depth information SD03 which defines "indoor" and subsidiary depth information SD04 which defines "portrait" are illustrated. The subsidiary depth information SD03 indicates that the depth is larger at the center of the X and Y axes than at the ends thereof. The subsidiary depth information SD04 indicates that the depth is uniform at all the pixel positions.

1-5. Modifying Unit

The modifying unit 150 modifies depth information received from the depth information obtaining unit 120 (hereinafter referred to as basic depth information) in accordance with a determination result generated by the determining unit 130, thereby generating modified depth information.

For example, upon receiving a scene identifier of an input image determined by the scene determining module 132, the modifying unit 150 obtains subsidiary depth information associated with the type of scene identified by the scene identifier from the subsidiary depth DB 140. Then, the modifying unit 150 combines the obtained subsidiary depth information and the basic depth information, thereby generating modified depth information.

Figure 4:
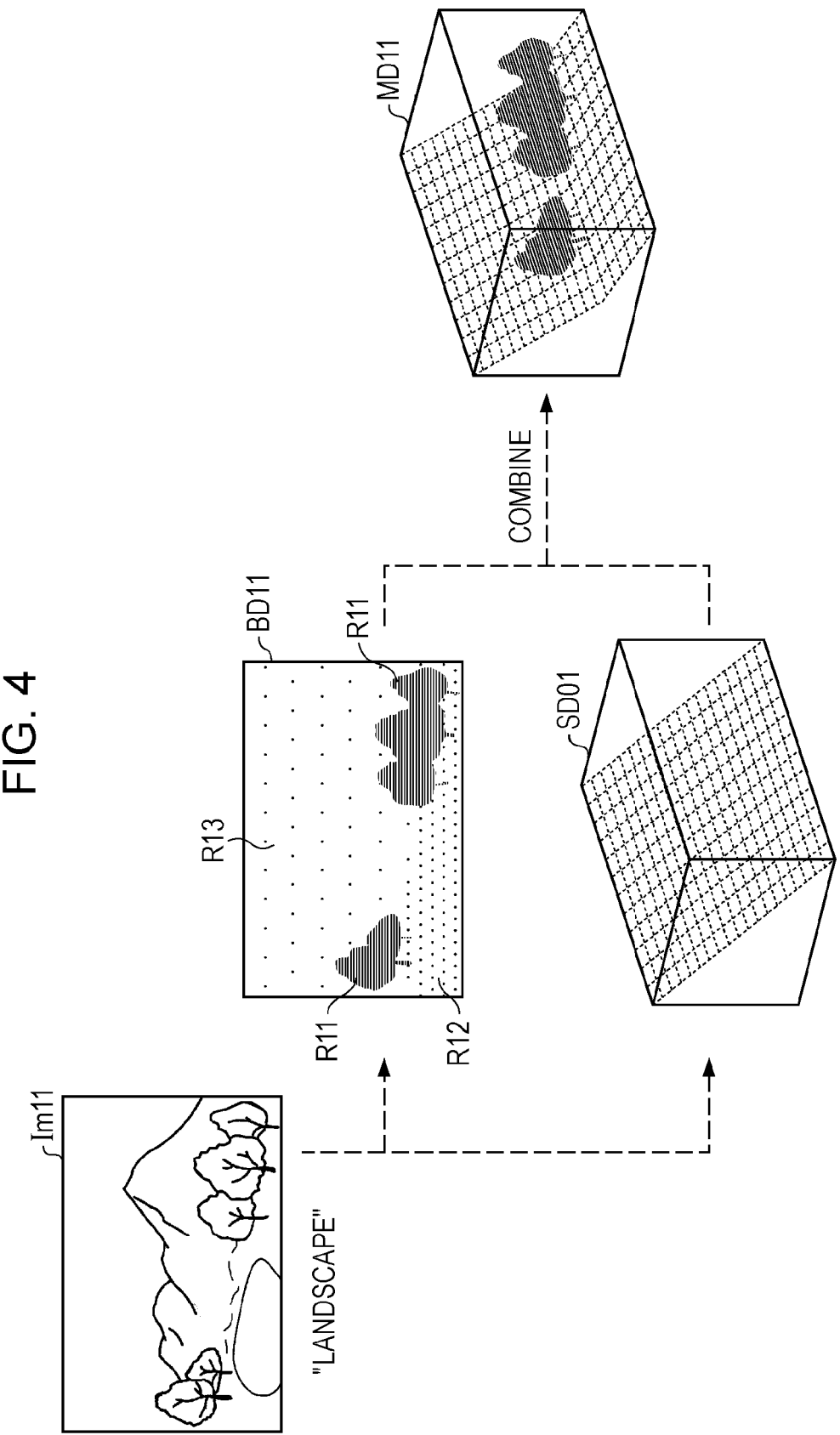
FIG. 4 is an explanatory diagram describing modification of depth information using subsidiary depth information.

FIG. 4 is an explanatory diagram describing modification of depth information using subsidiary depth information. In the upper left portion of FIG. 4, an input image Im11 as an example is illustrated. The type of scene of the input image Im11 is "landscape". In the upper center portion of FIG. 4, basic depth information BD11 which is obtained for the input image Im11 is illustrated. In the basic depth information BD11, the depth of a region R11 is smaller than the depths of regions R12 and R13. The depth of the region R12 is smaller than the depth of the region R13. In the lower center portion of FIG. 4, the subsidiary depth information SD01 illustrated in FIG. 2, which is associated with "landscape", is illustrated. The modifying unit 150 combines, for each pixel, the depth represented by the basic depth information BD11 and the depth represented by the subsidiary depth information SD01, thereby calculating depth values of individual pixels for modified depth information MD11. Here, the combining may be simple calculation of an average value or may be weighting addition using a certain weight. In the right portion of FIG. 4, the modified depth information MD11 which is generated from the basic depth information BD11 and the subsidiary depth information SD01 is illustrated.

For example, upon receiving face region information indicating the position of a face region, the modifying unit 150 modifies the depths in pixels included in the face region among the depths represented by the basic depth information (or depth information modified using subsidiary depth information). The modifying unit 150 may modify the depth to reduce the depth of the face region by subtracting a certain offset value from the depths in the pixels included in the face region. When it is undesirable that face skin looks coarse, for example, the modifying unit 150 may modify the depth to increase the depth of the face region by adding a certain offset value to the depths in the pixels included in the face region.

For example, upon receiving target object information indicating the position of a target object, the modifying unit 150 modifies the depths in pixels at the position of the target object among the depths represented by the basic depth information (or depth information modified using other information). Typically, the modifying unit 150 subtracts a certain offset value from the depths in the pixels at the position of the target object. Different offset values may be used in accordance with the type of a target object.

FIG. 5 is an explanatory diagram describing modification of depth information which is performed in accordance with a result of determining a region. In the upper portion of FIG. 5, an input image Im21 as an example is illustrated. The input image Im21 includes a person and a vehicle, which is a moving object. In the lower portion of FIG. 5, a determination result SD21 which is to be input to the modifying unit 150 for the input image Im21 is illustrated. In the determination result SD21, a region R21 is a face region. The modifying unit 150 subtracts an offset value $d_1$ from the depth represented by depth information for pixels included in the region R21. A region R22 is a region where a moving object is detected. The modifying unit 150 subtracts an offset value $d_2$ from the depth represented by depth information for the pixels included in the region R22. The offset values $d_1$ and $d_2$ may be equal to or different from each other.

For example, upon receiving edge region information or texture region information, the modifying unit 150 modifies the depths in pixels included in the edge region or texture region among the depths represented by the basic depth information (or depth information modified using other information). For example, the modifying unit 150 may subtract a certain offset value from the depths in the pixels included in the edge region. Alternatively or additionally, the modifying unit 150 may add a certain offset value to the depths in the pixels included in the texture region.

The modifying unit 150 outputs the modified depth information generated in this way to the enhancing unit 160.

1-6. Enhancing Unit

The enhancing unit 160 performs a stereoscopic effect enhancement process for enhancing the stereoscopic effect of an input image by using modified depth information received from the modifying unit 150. The stereoscopic effect enhancement process performed in this embodiment is a process of enhancing a stereoscopic effect by using a visual characteristic related to an atmospheric perspective method or an aerial perspective method. For example, perspective (stereoscopic effect) can be perceived in accordance with the visual characteristic of a human when contrast is high in a foreground and is low in a background. Other than contrast, parameters such as sharpness, brightness, saturation, and resolution can be adjusted to express perspective in accordance with the atmospheric perspective method.

The enhancing unit 160 may enhance the stereoscopic effect of an input image so that at least one of the above-described parameters increases for a pixel having a smaller depth represented by the modified depth information. Alternatively or additionally, the enhancing unit 160 may enhance the stereoscopic effect of an input image so that at least one of the above-described parameters decreases for a pixel having a larger depth represented by the modified depth information. A parameter value may be adjusted by using a filter having a variable filter strength. Alternatively, a parameter value of brightness, saturation, or the like may be adjusted by increasing or decreasing color components of individual pixels. In this embodiment, the enhancing unit 160 adaptively adjusts the above-described parameter value by applying a method called a classification adaptation process, which is described in Japanese Unexamined Patent Application Publications No. 2011-217010 and No. 2011-217140.

Figure 6:
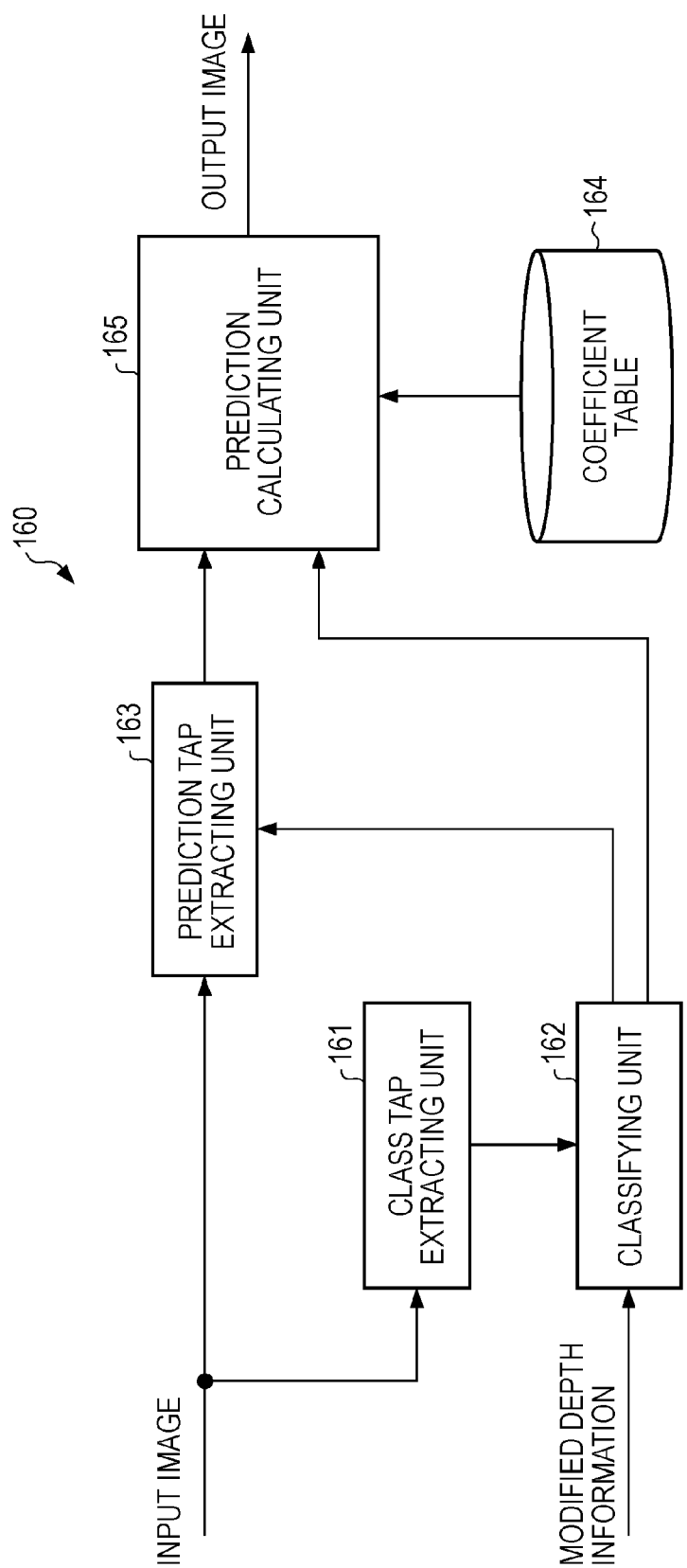
FIG. 6 is a block diagram illustrating an example of a specific configuration of an enhancing unit according to an embodiment.

FIG. 6 is a block diagram illustrating an example of a specific configuration of the enhancing unit 160 according to this embodiment. Referring to FIG. 6, the enhancing unit 160 includes a class tap extracting unit 161, a classifying unit 162, a prediction tap extracting unit 163, a coefficient table 164, and a prediction calculating unit 165.

The class tap extracting unit 161 extracts, from an input image, a class tap which is used for classifying individual pixels. The class tap is a set of a target pixel and surrounding pixels which is referred to at the time of classifying the target pixel to any one of a plurality of classes in accordance with a pattern of a pixel value. The class tap may be, for example, nine pixels arranged in a cross-shape constituted by five horizontal pixels and five vertical pixels, with a target pixel at the center. The class tap is not limited to this example, and may be any set of a target pixel and surrounding pixels. The class tap extracting unit 161 sequentially outputs class taps extracted for individual target pixels to the classifying unit 162 while scanning individual pixels serving as the target pixels in an input image.

The classifying unit 162 classifies the individual target pixels to any one of a plurality of classes, in accordance with a pattern of pixel values of class taps received from the class tap extracting unit 161 and the depths represented by modified depth information. The classifying unit 162 may determine the class of each target pixel by using, for example, an adaptive dynamic range coding (ADRC) method. Alternatively, the classifying unit 162 may determine the class of each target pixel by quantizing a vector constituted by a pixel value of a class tap and a depth of a target pixel. The classifying unit 162 outputs class codes representing the classes determined for the individual target pixels to the prediction tap extracting unit 163 and the prediction calculating unit 165.

The prediction tap extracting unit 163 extracts, for each target pixel, a prediction tap serving as a filter tap on which filtering is to be performed in the prediction calculating unit 165 from the input image. The prediction tap may be, for example, thirteen pixels arranged in a rhombus-shape in which five pixels are arranged on a diagonal line, with a target pixel at the center. The prediction tap is not limited to this example, and may be any set of a target pixel and surrounding pixels. The prediction tap extracting unit 163 outputs prediction taps extracted for individual target pixels to the prediction calculating unit 165.

The coefficient table 164 is a table which stores sets of filter coefficients for individual classes determined in advance. Filter coefficients can be learned in a preliminary learning process described below, by using teacher images and student images for individual classes used for classification which is performed using a class tap and a depth.

The prediction calculating unit 165 obtains, from the coefficient table 164, a filter coefficient corresponding to a class indicated by a class code received from the classifying unit 162. Also, the prediction calculating unit 165 performs filtering on a prediction tap received from the prediction tap extracting unit 163 by using the obtained filter coefficient, thereby generating a predicted pixel value of each target pixel.

The predicted pixel values which are sequentially output from the prediction calculating unit 165 along with scanning of an input image constitute an output image from the image processing apparatus 100. The filter coefficients used by the prediction calculating unit 165 are learned in advance so that a student image becomes similar to a teacher image, which is generated by enhancing a stereoscopic effect of the student image by using a visual characteristic related to the atmospheric perspective method. Thus, a stereoscopic effect which is subjectively perceived from an output image generated through filtering using the filter coefficients is greater than a stereoscopic effect which is perceived from an input image. A learning process for a classification adaptation process will be further described below.

The enhancing unit 160 may enhance a stereoscopic effect by adjusting parameters, such as contrast, sharpness, brightness, saturation, and resolution in accordance with depths represented by modified depth information, and also may improve image quality by removing noise and blur.

1-7. Flow of Process (1) Overall Process

Figure 7:
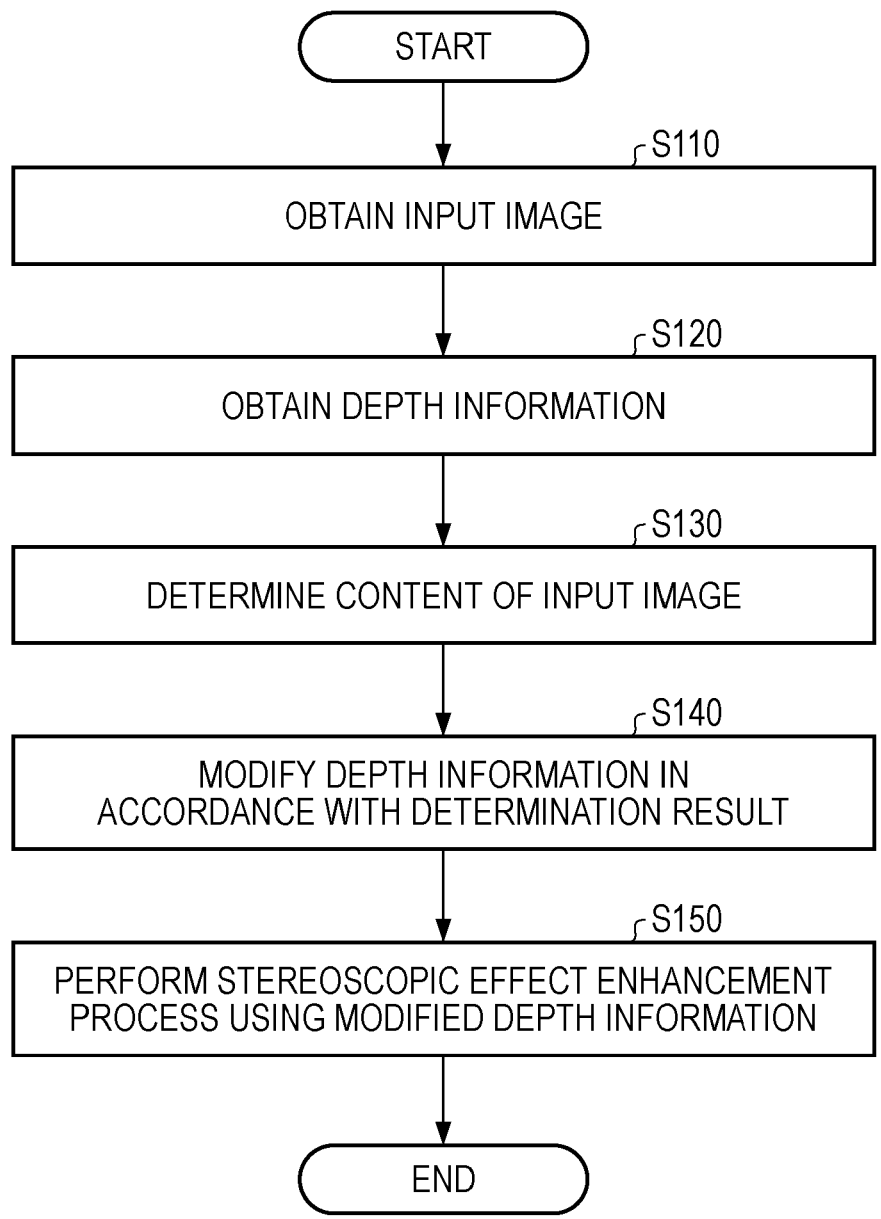
FIG. 7 is a flowchart illustrating an example of a flow of image processing according to an embodiment.

FIG. 7 is a flowchart illustrating an example of a flow of image processing performed by the image processing apparatus 100 according to this embodiment.

Referring to FIG. 7, the image obtaining unit 110 obtains an input image in step 110. Then, the image obtaining unit 110 outputs the obtained input image to the depth information obtaining unit 120, the determining unit 130, and the enhancing unit 160.

In step S120, the depth information obtaining unit 120 obtains depth information representing depths in individual pixels of the input image. Then, the depth information obtaining unit 120 outputs the obtained depth information to the modifying unit 150.

In step S130, the determining unit 130 determines the type of scene of the input image, and a face region, a region forming a target object, an edge region, and so forth of the input image. Then, the determining unit 130 outputs information representing the determination result (for example, a scene identifier and so forth) to the modifying unit 150.

In step S140, the modifying unit 150 modifies the depth information received from the depth information obtaining unit 120 in accordance with the determination result received from the determining unit 130, thereby generating modified depth information. Then, the modifying unit 150 outputs the modified depth information to the enhancing unit 160.

In step S150, the enhancing unit 160 performs a stereoscopic effect enhancement process for enhancing the stereoscopic effect of the input image by using the modified depth information received from the modifying unit 150. An output image which is output from the enhancing unit 160 and which has an enhanced stereoscopic effect may be displayed on a display or may be stored in a storage medium.

(2) Stereoscopic Effect Enhancement Process

Figure 8:
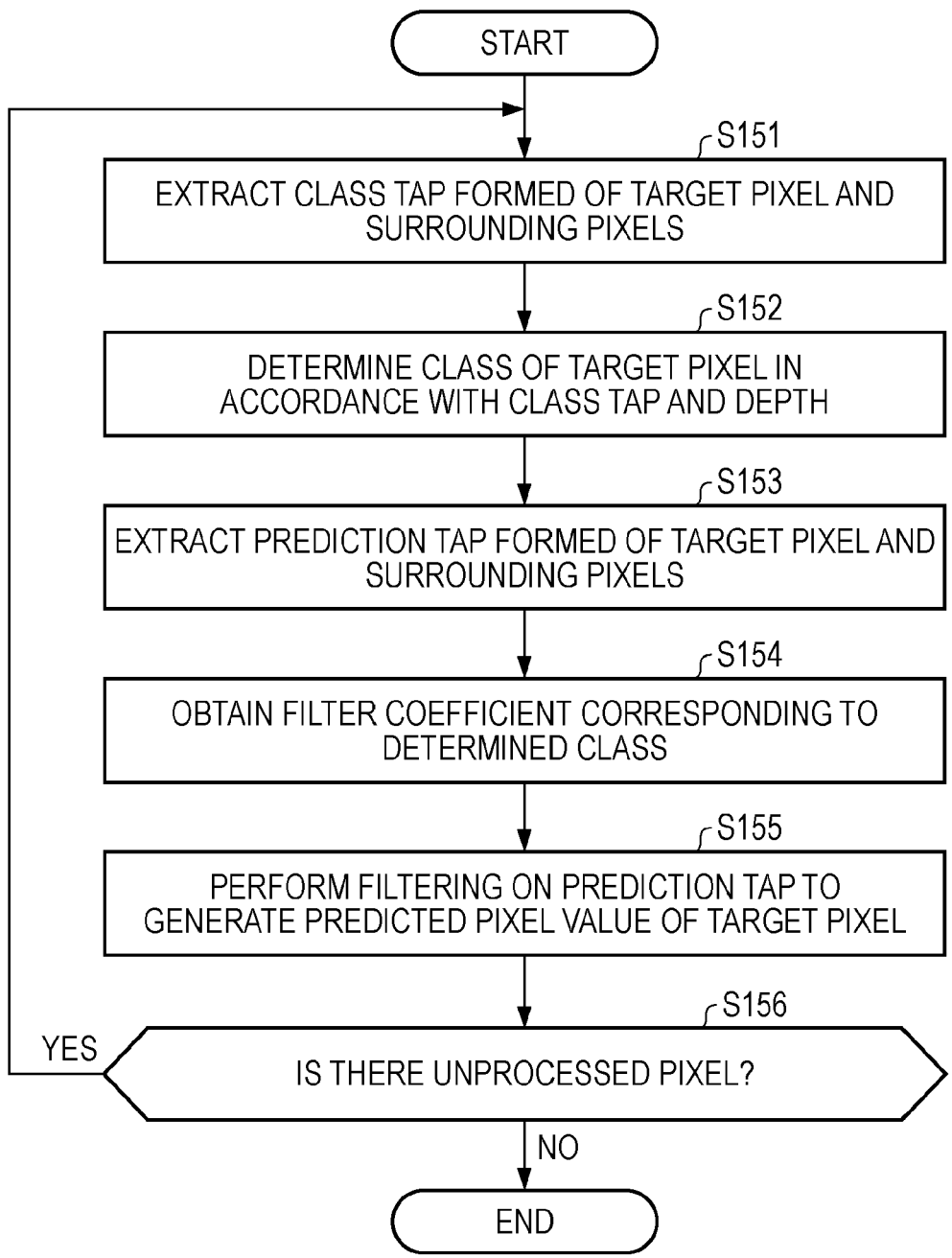
FIG. 8 is a flowchart illustrating an example of a specific flow of a stereoscopic effect enhancement process illustrated in FIG. 7.

FIG. 8 is a flowchart illustrating an example of a specific flow of the stereoscopic effect enhancement process which is performed in step S150 in FIG. 7. The stereoscopic effect enhancement process illustrated in FIG. 8 is repeatedly performed by regarding each pixel of the input image as a target pixel.

Referring to FIG. 8, in step S151, the class tap extracting unit 161 extracts a class tap formed of a target pixel and surrounding pixels of the target pixel. Then, the class tap extracting unit 161 outputs the extracted class tap to the classifying unit 162.

In step S152, the classifying unit 162 determines the class of the target pixel in accordance with the class tap received from the class tap extracting unit 161 and the depth represented by the modified depth information. Then, the classifying unit 162 outputs a class code representing the determined class to the prediction tap extracting unit 163 and the prediction calculating unit 165.

In step S153, the prediction tap extracting unit 163 extracts a prediction tap formed of the target pixel and surrounding pixels of the target pixel. The location of a prediction tap may be changed depending on the class of the target pixel. The prediction tap extracting unit 163 outputs the extracted prediction tap to the prediction calculating unit 165.

In step S154, the prediction calculating unit 165 obtains a filter coefficient corresponding to the class of the target pixel from the coefficient table 164. Then, in step S155, the prediction calculating unit 165 performs filtering on the prediction tap received from the prediction tap extracting unit 163 by using the obtained filter coefficient, thereby generating a predicted pixel value of the target pixel.

In step S156, if there is an unprocessed pixel in the input image, the above-described process is repeated by regarding the next pixel as a target pixel. On the other hand, if there is no unprocessed pixel, the stereoscopic effect enhancement process in FIG. 8 ends.

2. Second Embodiment

In a second embodiment, a stereoscopic effect of an image is enhanced in an apparatus for reproducing a stereoscopic image, by using a method similar to the method described above in the first embodiment.

Figure 9:
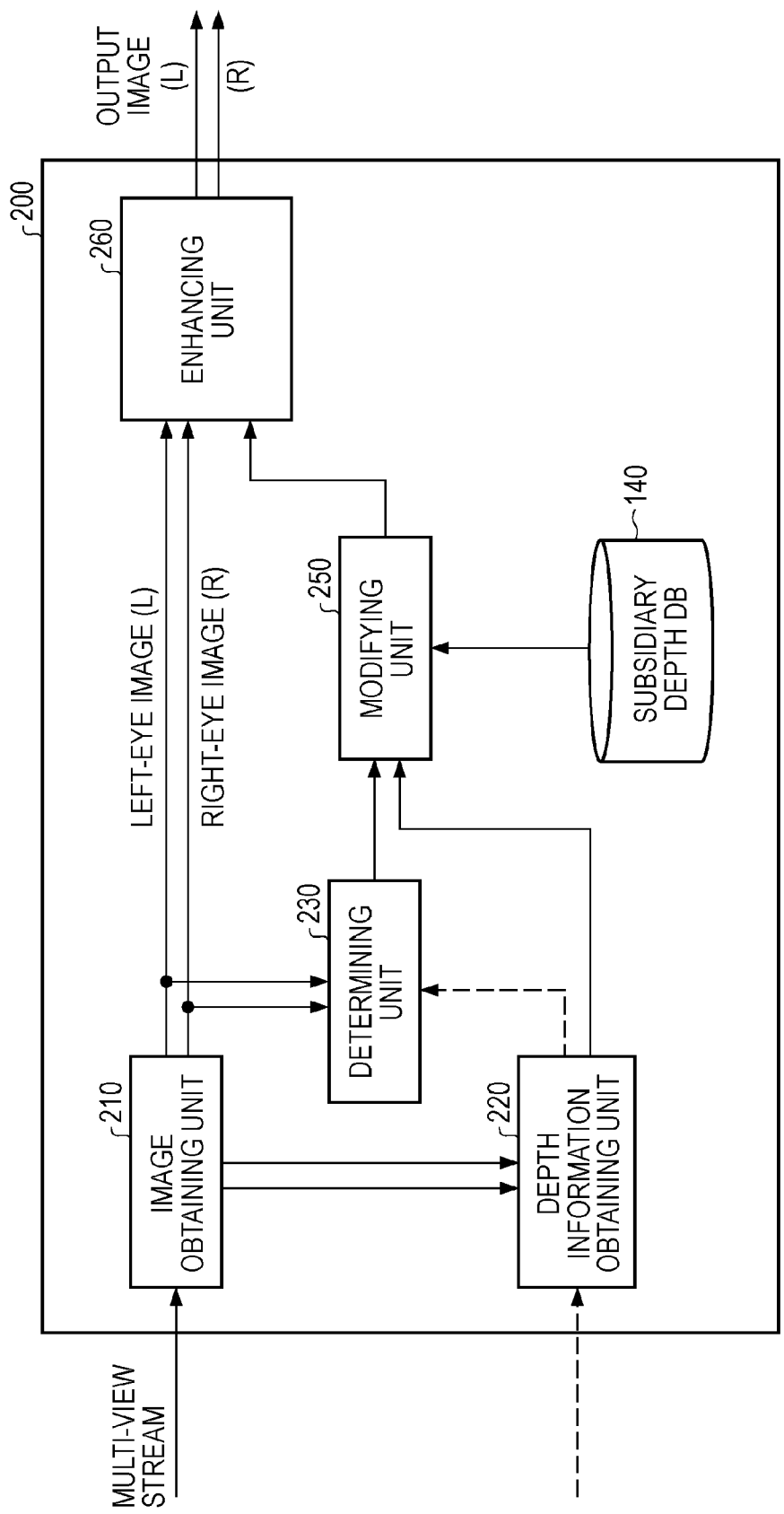
FIG. 9 is a block diagram illustrating an example of a configuration of an image processing apparatus according to a second embodiment.

FIG. 9 is a block diagram illustrating an example of a configuration of an image processing apparatus 200 according to the second embodiment. Referring to FIG. 9, the image processing apparatus 200 includes an image obtaining unit 210, a depth information obtaining unit 220, a determining unit 230, the subsidiary depth DB 140, a modifying unit 250, and an enhancing unit 260.

The image obtaining unit 210 obtains a multi-view stream including a left-eye image and a right-eye image, and separates the left-eye image and the right-eye image from the obtained stream. The image obtaining unit 210 outputs the left-eye image and the right-eye image to the depth information obtaining unit 220, the determining unit 230, and the enhancing unit 260.

The depth information obtaining unit 220 obtains depth information representing the depths in individual pixels of a stereoscopic image. Like the depth information obtaining unit 120 according to the first embodiment, the depth information obtaining unit 220 may generate depth information by using a method such as frequency analysis, or may obtain depth information from another apparatus. Alternatively, the depth information obtaining unit 220 may calculate the parallax between the left-eye image and the right-eye image and generate depth information in accordance with the parallax. The depth information obtaining unit 220 outputs the depth information to the modifying unit 250.

The determining unit 230 determines the content of the stereoscopic image by using at least one of the left-eye image and the right-eye image. Like the determining unit 130 according to the first embodiment, the determining unit 230 may determine the type of scene of the stereoscopic image, and a face region of a person, a region forming a target object, and an edge region or texture region of the stereoscopic image. The determining unit 230 outputs the determination result to the modifying unit 250.

Like the modifying unit 150 according to the first embodiment, the modifying unit 250 modifies basic depth information received from the depth information obtaining unit 220 in accordance with the determination result generated by the determining unit 230, thereby generating modified depth information. Then, the modifying unit 250 outputs the generated modified depth information to the enhancing unit 260.

The enhancing unit 260 performs a stereoscopic effect enhancement process for enhancing the stereoscopic effect of one or both of the right-eye image and the left-eye image constituting the stereoscopic image by using the modified depth information received from the modifying unit 250. The stereoscopic effect enhancement process performed in this embodiment is a process using a visual characteristic related to the atmospheric perspective method, and is similar to the stereoscopic effect enhancement process according to the first embodiment. That is, parameters, such as contrast, sharpness, brightness, saturation, and resolution, of one or both of the right-eye image and the left-eye image can be adjusted in accordance with the depth represented by the modified depth information.

The right-eye image and the left-eye image output from the enhancing unit 260 are displayed on a display, and thereby the stereoscopic image is reproduced.

Generally, when parallax of a stereoscopic image which is perceived based on binocular parallax is extremely enhanced, a poor health condition of a user, such as eyestrain, may be caused. However, according to the method of this embodiment, the stereoscopic effect of both right-eye and left-eye images is enhanced using a visual characteristic related to the atmospheric perspective method, without changing binocular parallax. Accordingly, a stereoscopic image with an enhanced stereoscopic effect can be provided without increasing the risk of causing a poor health condition of the user.

3. Learning of Filter Coefficients

Hereinafter, description will be given of a learning process for learning filter coefficients which are used in a stereoscopic effect enhancement process to which classification adaptation process is applied.

Figure 10:
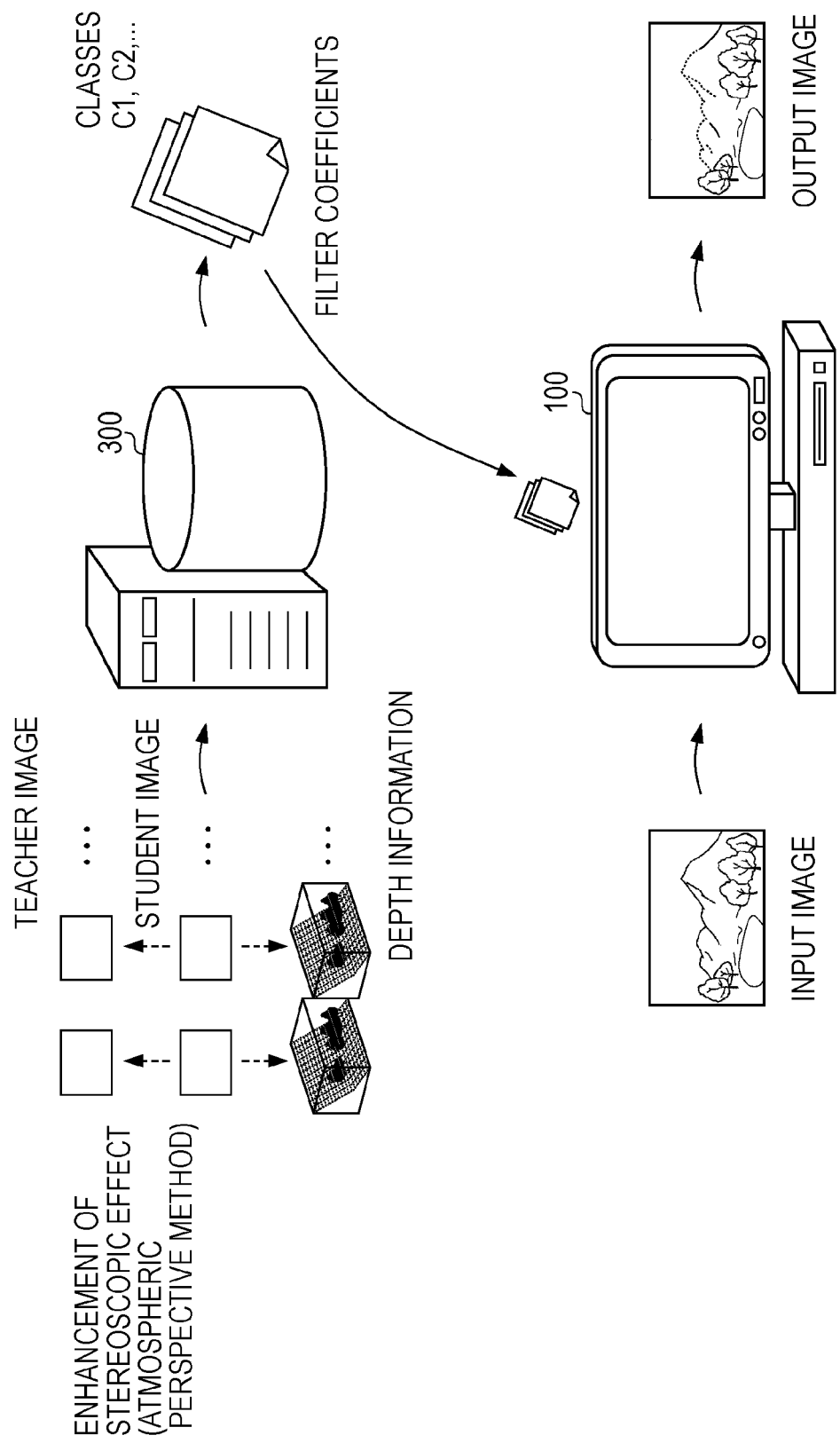
FIG. 10 is an explanatory diagram describing learning of filter coefficients for a stereoscopic effect enhancement process as an example.

FIG. 10 is an explanatory diagram describing learning of filter coefficient for a stereoscopic effect enhancement process.

Referring to FIG. 10, the image processing apparatus 100 and a learning apparatus 300 are illustrated as an example. The learning apparatus 300 performs a so-called supervised learning process by using a plurality of sets of a student image and a teacher image corresponding to the student image. A teacher image used here is an image which is generated by adjusting the values of parameters, such as contrast, sharpness, brightness, saturation, and resolution of the corresponding student image in accordance with the depth in each pixel by using the atmospheric perspective method. In addition to adjustment of these parameter values, removal of noise and blur may be performed. Depth information regarding individual student images is also input to the learning apparatus 300. The learning apparatus 300 determines the classes of individual pixels in accordance with pixel values and depths of a student image, and learns, for each of the classes, a set of optimum filter coefficients to cause the pixel values of the student image to be approximate to the pixel values of the corresponding teacher image. In the example illustrated in FIG. 10, a set of filter coefficients is determined for each of a plurality of classes including classes C1 and C2.

The image processing apparatus 100 predicts an output image having an enhanced stereoscopic effect from an input image, by using sets of filter coefficients for individual classes determined by the learning apparatus 300. That is, the image processing apparatus 100 may serve as a prediction apparatus. The image processing apparatus 100 stores, in the coefficient table 164 illustrated in FIG. 6, sets of filter coefficients determined through a preliminary learning process performed by the learning apparatus 300, as described above. Also, the image processing apparatus 100 determines the classes of individual pixels by using depth information modified in accordance with a determination result about the content of an input image, and performs filtering on prediction taps of the individual pixels by using the filter coefficients corresponding to the determined classes.

With the above-described classification adaptation process, various parameter values related to the atmospheric perspective method can be simultaneously adjusted through one filtering process using optimum filter coefficients for individual pixels. Thus, compared to a method of sequentially using a plurality of filters prepared for individual parameters (for example, a contrast adjustment filter, a sharpness adjustment filter, and a noise removal filter), a delay caused by a stereoscopic effect enhancement process can be reduced. Also, mutual cancellation of filtering effects between a plurality of filters can be prevented.

4. Application Examples

The technology according to the present disclosure can be applied to various electronic apparatuses, such as a transmitter which broadcasts or distributes an image, a receiver which receives an image, a recording apparatus which records an image on a medium such as an optical disc or a magnetic disk, or a reproducing apparatus which reproduces a received or recorded image. Hereinafter, four application examples will be described.

4-1. First Application Example

Figure 11:
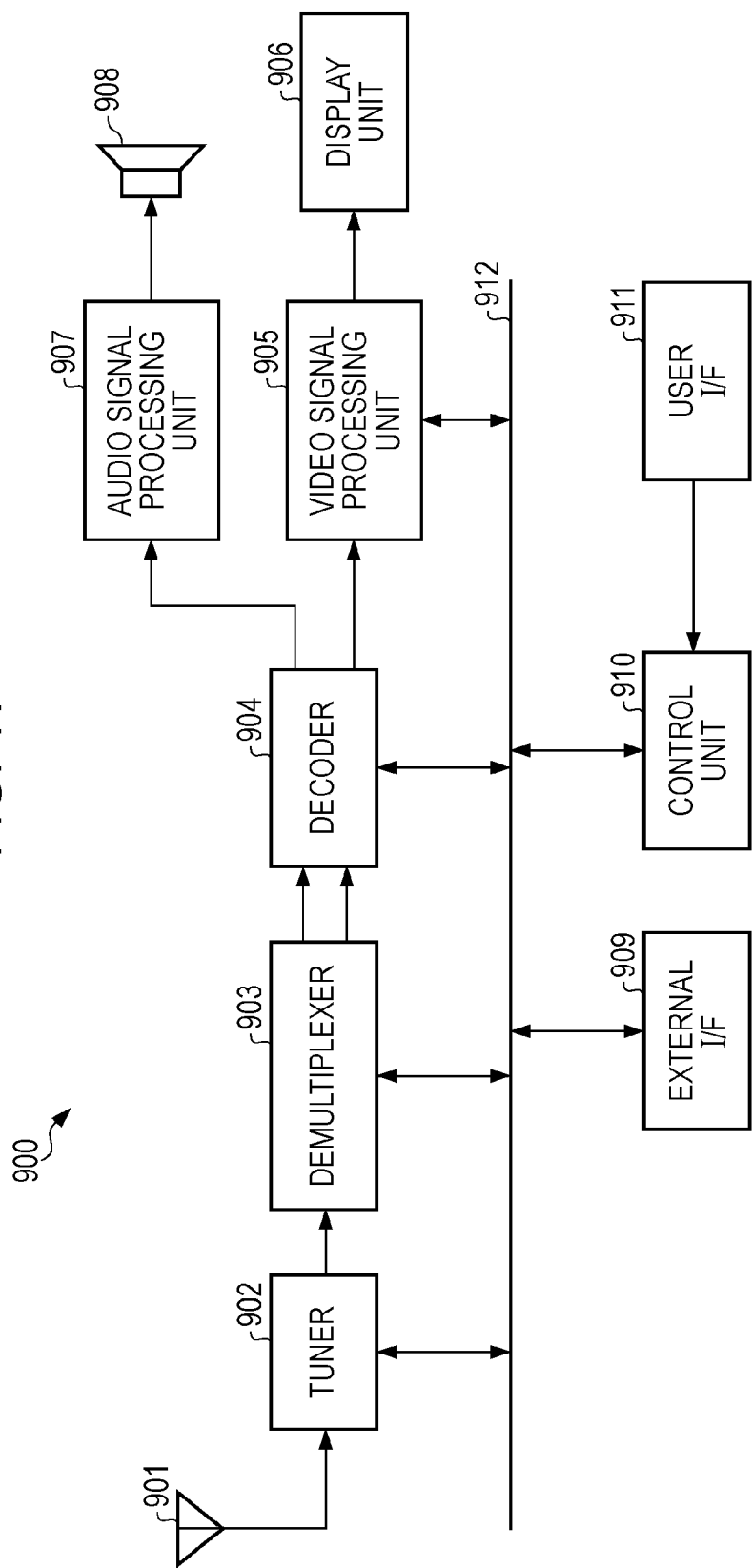
FIG. 11 is a block diagram illustrating an example of a schematic configuration of a television apparatus.

FIG. 11 illustrates an example of a schematic configuration of a television apparatus to which the technology according to the present disclosure is applied. The television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcast signal received via the antenna 901, and demodulates the extracted signal. Then, the tuner 902 outputs an encoded bit stream obtained thorough the demodulation to the demultiplexer 903. That is, the tuner 902 functions as a communication unit in the television apparatus 900 for receiving an encoded stream including encoded images.

The demultiplexer 903 separates, from the encoded bit stream, a video stream and an audio stream of a target program to be viewed and listened, and outputs the separated streams to the decoder 904. Also, the demultiplexer 903 extracts subsidiary data such as an electronic program guide (EPG) from the encoded bit stream, and supplies the extracted data to the control unit 910. The demultiplexer 903 may perform descrambling if the encoded bit stream is scrambled.

The decoder 904 decodes the video stream and the audio stream received from the demultiplexer 903. Then, the decoder 904 outputs video data generated through the decode process to the video signal processing unit 905. Also, the decoder 904 outputs audio data generated through the decode process to the audio signal processing unit 907.

The video signal processing unit 905 reproduces the video data received from the decoder 904 and causes the display unit 906 to display video. The video signal processing unit 905 may cause the display unit 906 to display an application screen supplied via a network. Also, the video signal processing unit 905 may perform an additional process, such as noise removal, in accordance with settings. Furthermore, the video signal processing unit 905 may generate an image of a graphical user interface (GUI) such as a menu, button, or cursor, and may superimpose the generated image on an output image.

The display unit 906 is driven by a drive signal supplied from the video signal processing unit 905, and displays video or an image on a video screen of a display device (for example, a liquid crystal display, a plasma display, or an organic light-emitting diode (OLED) display).

The audio signal processing unit 907 performs a reproduction process, including D/A conversion and amplification, on audio data received from the decoder 904, and causes the speaker 908 to output sound. The audio signal processing unit 907 may perform an additional process, such as noise removal, on the audio data.

The external interface 909 is an interface for connecting the television apparatus 900 to an external apparatus or a network. For example, a video stream or an audio stream received via the external interface 909 may be decoded by the decoder 904. That is, the external interface 909 functions as a communication unit in the television apparatus 900 for receiving an encoded stream including encoded images.

The control unit 910 includes a processor such as a central processing unit (CPU), and a memory such as a random access memory (RAM) and a read only memory (ROM). The memory stores a program executed by the CPU, program data, EPG data, and data obtained via a network. The program stored in the memory is, for example, read and executed by the CPU at the startup of the television apparatus 900. The CPU executes the program, and thereby controls the operation of the television apparatus 900 in response to, for example, an operation signal received from the user interface 911.

The user interface 911 is connected to the control unit 910. The user interface 911 includes, for example, a button and a switch used by a user to operate the television apparatus 900, and a receiving unit for receiving a remote control signal. The user interface 911 detects a user operation via these elements to generate an operation signal, and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 to one another.

In the television apparatus 900 having the above-described configuration, the video signal processing unit 905 has the function of the image processing apparatus 100 or 200. Thus, in the case of displaying an image in the television apparatus 900, subjective image quality can be increased by enhancing a stereoscopic effect.

4-2. Second Application Example

Figure 12:
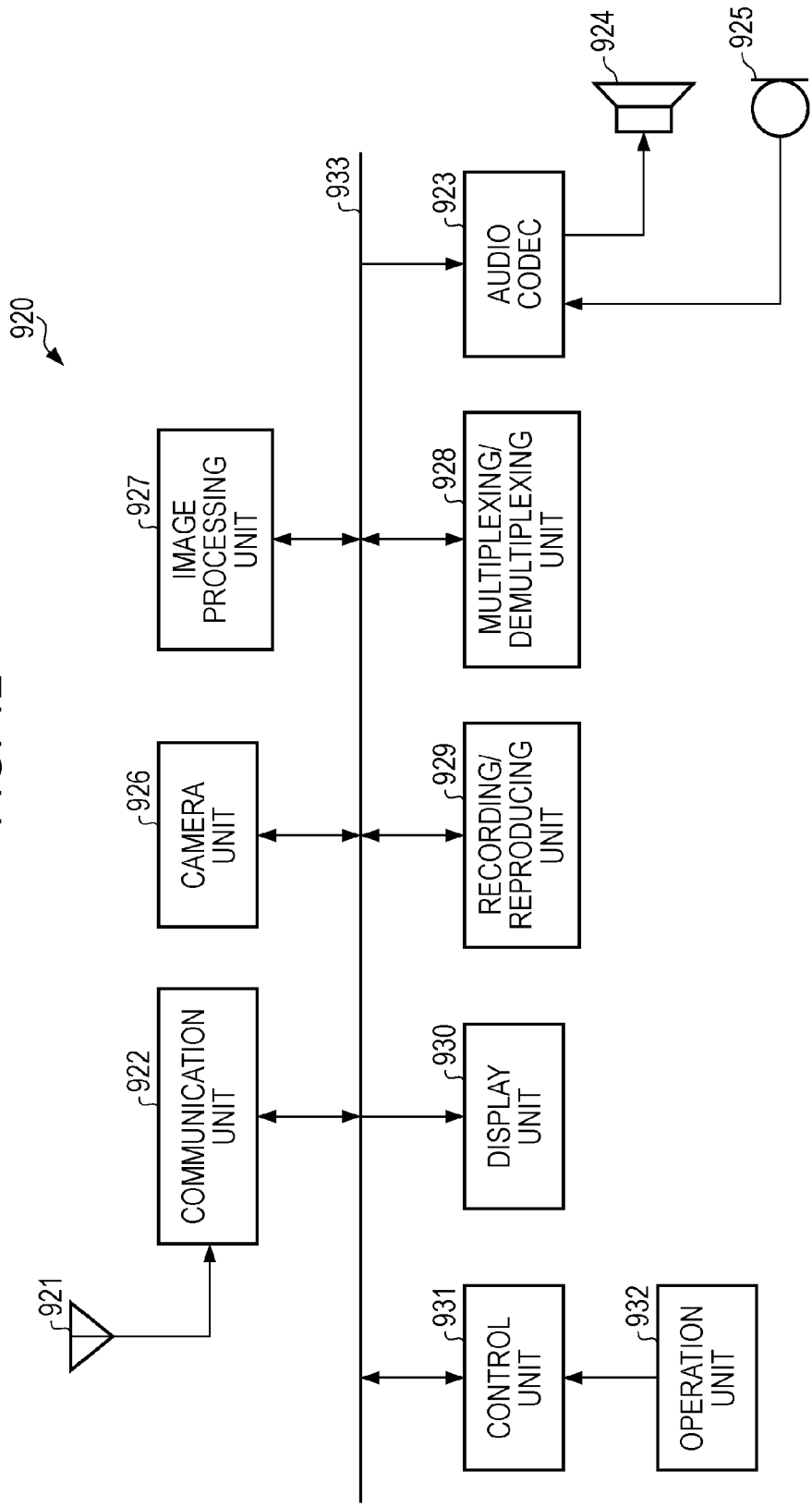
FIG. 12 is a block diagram illustrating an example of a schematic configuration of a mobile phone.

FIG. 12 illustrates an example of a schematic configuration of a mobile phone to which the technology according to the present disclosure is applied. The mobile phone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the multiplexing/demultiplexing unit 928, the recording/reproducing unit 929, the display unit 930, and the control unit 931 to one another.

The mobile phone 920 performs various operations, such as transmission and reception of audio signals, transmission and reception of an electronic mail (e-mail) or image data, image capturing, and data recording, in various modes including a voice call mode, a data communication mode, a photography mode, and a video phone mode.

In the voice call mode, an analog audio signal generated by the microphone 915 is supplied to the audio codec 923. The audio codec 923 converts the analog audio signal to audio data, A/D converts the audio data, and compresses the audio data. Then, the audio codec 923 outputs the compressed audio data to the communication unit 922. The communication unit 922 encodes and modulates the audio data to generate a transmission signal. Then, the communication unit 922 transmits the generated transmission signal to a base station (not illustrated) via the antenna 921. Also, the communication unit 922 amplifies a radio signal received via the antenna 921 and performs frequency conversion thereon, thereby obtaining a reception signal. Then, the communication unit 922 demodulates and decodes the reception signal to generate audio data, and outputs the generated audio data to the audio codec 923. The audio codec 923 decompresses and D/A converts the audio data to generate an analog audio signal. Then, the audio codec 923 supplies the generated audio signal to the speaker 924 to output voice.

In the data communication mode, for example, the control unit 931 generates character data constituting an e-mail in accordance with a user operation performed via the operation unit 932. The control unit 931 causes the display unit 930 to display characters. Also, the control unit 931 generates e-mail data in response to a transmission instruction provided from a user via the operation unit 932, and outputs the generated e-mail data to the communication unit 922. The communication unit 922 encodes and modulates the e-mail data to generate a transmission signal. Then, the communication unit 922 transmits the generated transmission signal to the base station (not illustrated) via the antenna 921. Also, the communication unit 922 amplifies a radio signal received via the antenna 921 and performs frequency conversion thereon, thereby obtaining a reception signal. Then, the communication unit 922 demodulates and decodes the reception signal to restore e-mail data, and outputs the restored e-mail data to the control unit 931. The control unit 931 causes the display unit 930 to display the content of the e-mail, and stores the e-mail data in a storage medium of the recording/reproducing unit 929.

The recording/reproducing unit 929 includes a readable/writable storage medium. For example, the storage medium may be a built-in storage medium, such as a RAM or a flash memory, or may be an external storage medium, such as a hard disk, a magnetic disk, a magneto-optical disk, an optical disc, a universal serial bus (USB) memory, or a memory card.

In the photography mode, for example, the camera unit 926 captures an image of a subject to generate image data, and outputs the generated image data to the image processing unit 927. The image processing unit 927 encodes the image data received from the camera unit 926 to generate an encoded stream, and stores the encoded stream in the storage medium of the recording/reproducing unit 929.

In the video phone mode, for example, the multiplexing/demultiplexing unit 928 multiplexes a video stream encoded by the image processing unit 927 and an audio stream received from the audio codec 923, and outputs a multiplexed stream to the communication unit 922. The communication unit 922 encodes and modulates the multiplexed stream to generate a transmission signal. Then, the communication unit 922 transmits the generated transmission signal to the base station (not illustrated) via the antenna 921. Also, the communication unit 922 amplifies a radio signal received via the antenna 921 and performs frequency conversion thereon, thereby obtaining a reception signal. The transmission signal and the reception signal can include an encoded bit stream. The communication unit 922 demodulates and decodes the reception signal to restore a stream, and outputs the restored stream to the multiplexing/demultiplexing unit 928. The multiplexing/demultiplexing unit 928 separates a video stream and an audio stream from the received stream, and outputs the video stream to the image processing unit 927 and the audio stream to the audio codec 923. The image processing unit 927 decodes the video stream to generate video data. The video data is supplied to the display unit 930, and a series of images are displayed on the display unit 930. The audio codec 923 decompresses and D/A converts the audio stream, thereby generating an analog audio signal. Then, the audio codec 923 supplies the generated audio signal to the speaker 924 to output voice.

In the mobile phone 920 having the above-described configuration, the image processing unit 927 has the function of the image processing apparatus 100 or 200. Thus, in the case of recording or reproducing an image in the mobile phone 920, subjective image quality can be increased by enhancing a stereoscopic effect.

4-3. Third Application Example

Figure 13:
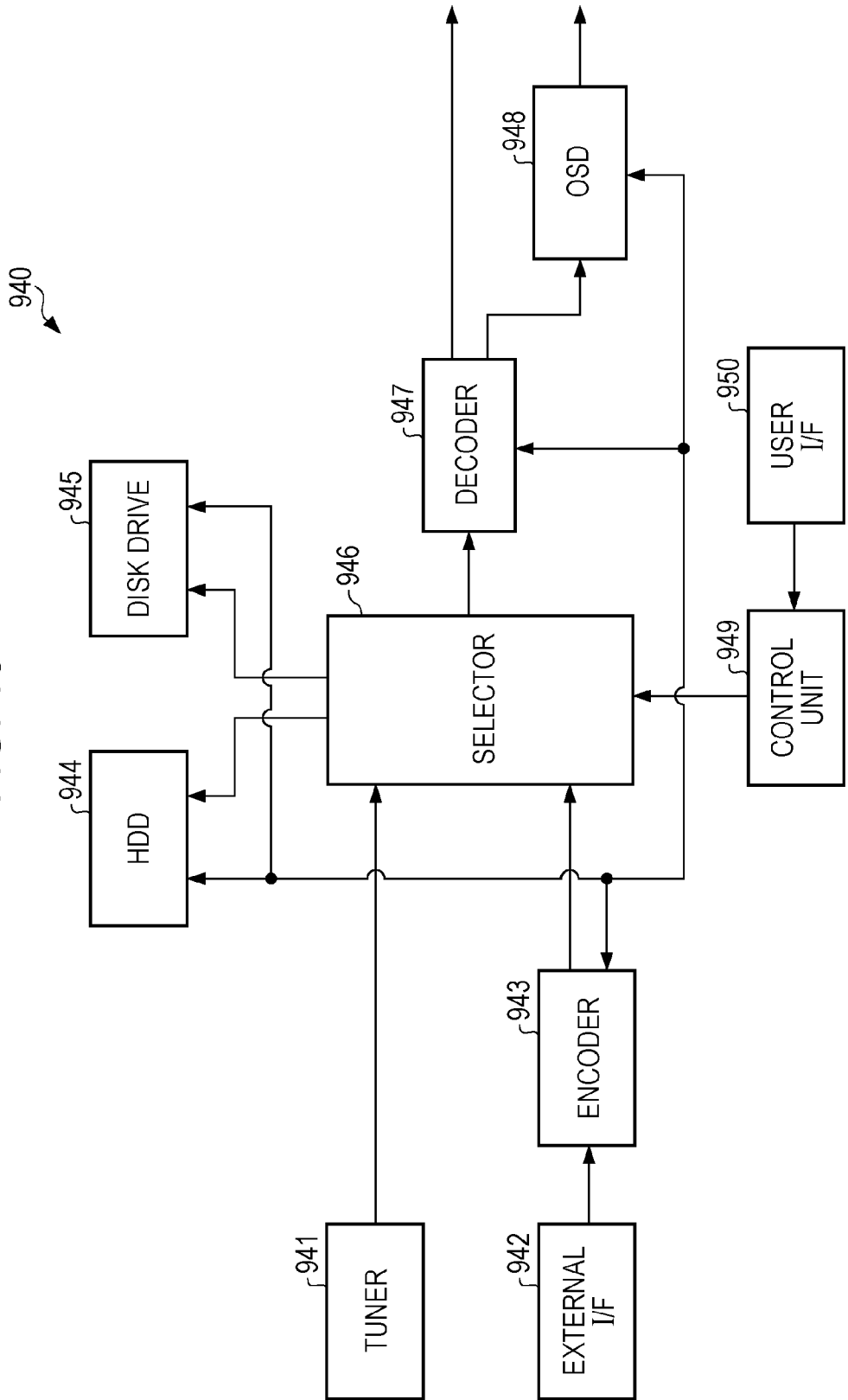
FIG. 13 is a block diagram illustrating an example of a schematic configuration of a recording/reproducing apparatus.

FIG. 13 illustrates an example of a schematic configuration of a recording/reproducing apparatus to which the technology according to the present disclosure is applied. The recording/reproducing apparatus 940 encodes audio data and video data of a received broadcast program and records them on a recording medium. The recording/reproducing apparatus 940 may encode audio data and video data obtained from another apparatus and record them on a recording medium. Also, the recording/reproducing apparatus 940 reproduces the data recorded on a recording medium on a monitor and a speaker in response to an instruction provided from a user. At this time, the recording/reproducing apparatus 940 decodes audio data and video data.

The recording/reproducing apparatus 940 includes a tuner 941, an external interface 942, an encoder 943, a hard disk drive (HDD) 944, a disk drive 945, a selector 946, a decoder 947, an on-screen display (OSD) 948, a control unit 949, and a user interface 950.

The tuner 941 extracts a signal of a desired channel from a broadcast signal received via an antenna (not illustrated), and demodulates the extracted signal. Then, the tuner 941 outputs an encoded bit stream obtained through the demodulation to the selector 946. That is, the tuner 941 functions as a communication unit in the recording/reproducing apparatus 940.

The external interface 942 is an interface for connecting the recording/reproducing apparatus 940 and an external apparatus or a network. The external interface 942 may be, for example, an IEEE 1394 interface, a network interface, a USB interface, or a flash memory interface. For example, video data and audio data received via the external interface 942 are input to the encoder 943. That is, the external interface 942 functions as a communication unit in the recording/reproducing apparatus 940.

When the video data and audio data received from the external interface 942 are not encoded, the encoder 943 encodes the video data and audio data. Then, the encoder 943 outputs an encoded bit stream to the selector 946.

The HDD 944 records an encoded bit stream including compressed video and audio content data, various programs, and other data in a hard disk provided therein. Also, the HDD 944 reads out these pieces of data from the hard disk at the time of reproducing images and sounds.

The disk drive 945 records data on and reads out data from a recording medium loaded therein. The recording medium loaded in the disk drive 945 may be, for example, a digital versatile disc (DVD), such as a DVD-video, DVD-RAM, DVD-R, DVD-RW, DVD+R, or DVD+RW, or a Blu-ray (registered trademark) disc.

During recording of video and voice, the selector 946 selects an encoded bit stream received from the tuner 941 or the encoder 943, and outputs the selected encoded bit stream to HDD 944 or the disk drive 945. During reproduction of video and voice, the selector 946 outputs an encoded bit stream received from the HDD 944 or the disk drive 945 to the decoder 947.

The decoder 947 decodes the encoded bit stream to generate video data and audio data. Then, the decoder 947 outputs the generated video data to the OSD 948. Also, the decoder 947 outputs the generated audio data to an external speaker.

The OSD 948 reproduces the video data received from the decoder 947 and displays video. The OSD 948 may superimpose a GUI image, such as a menu, button, or cursor, on the displayed video.

The control unit 949 includes a processor such as a CPU, and a memory such as a RAM and a ROM. The memory stores a program executed by the CPU and program data. The program stored in the memory is, for example, read and executed by the CPU at the startup of the recording/reproducing apparatus 940. The CPU executes the program, and thereby controls the operation of the recording/reproducing apparatus 940 in response to, for example, an operation signal received from the user interface 950.

The user interface 950 is connected to the control unit 949. The user interface 950 includes, for example, a button and a switch used by a user to operate the recording/reproducing apparatus 940, and a receiving unit for receiving a remote control signal. The user interface 950 detects an operation performed by the user via these elements to generate an operation signal, and outputs the generated operation signal to the control unit 949.

In the recording/reproducing apparatus 940 having the above-described configuration, the encoder 943 and the decoder 947 have the function of the image processing apparatus 100 or 200. Thus, in the case of recording or reproducing an image in the recording/reproducing apparatus 940, subjective image quality can be increased by enhancing a stereoscopic effect.

4-4. Fourth Application Example

Figure 14:
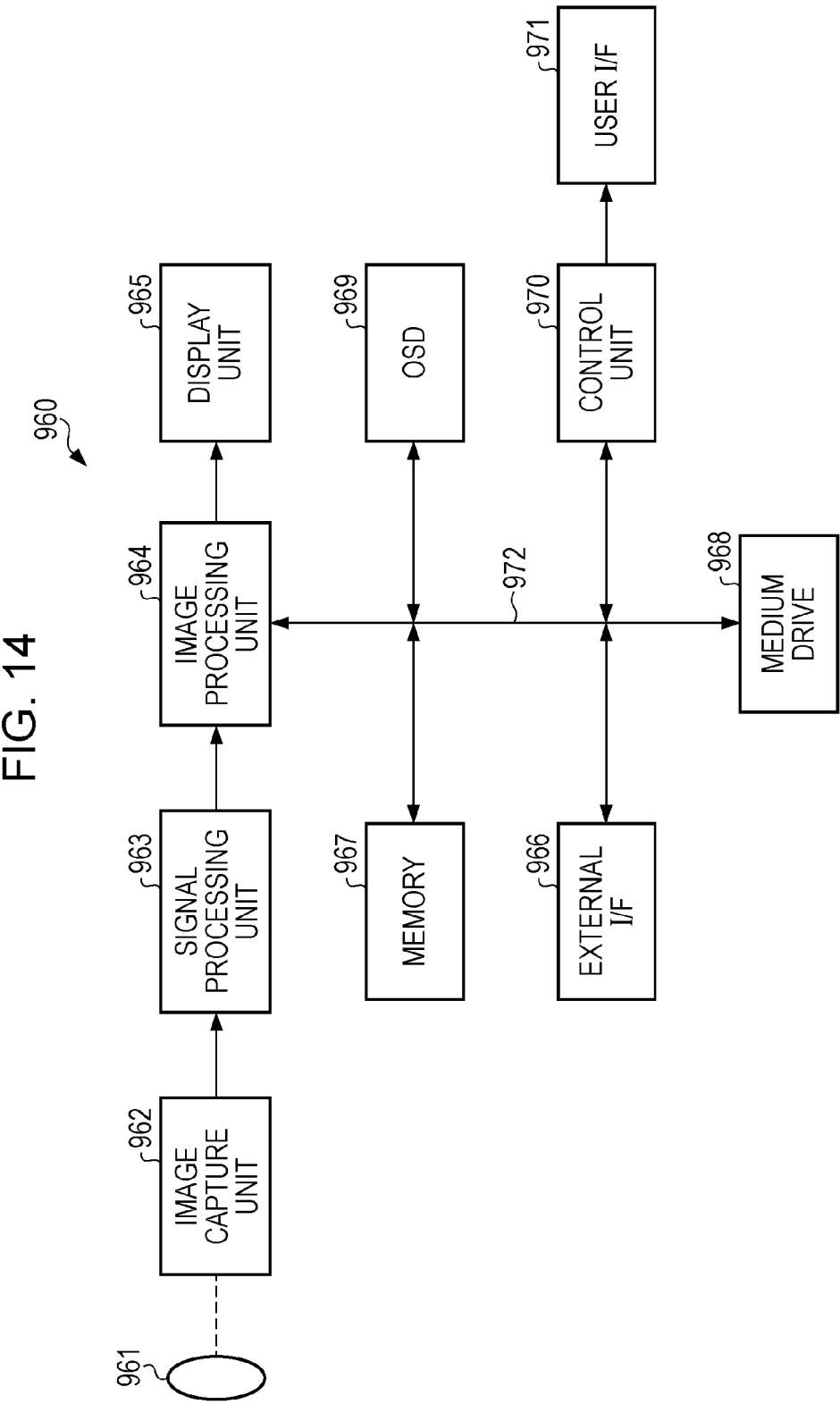
FIG. 14 is a block diagram illustrating an example of a schematic configuration of an image capture apparatus.

FIG. 14 illustrates an example of a schematic configuration of an image capture apparatus to which the technology of the present disclosure is applied. The image capture apparatus 960 captures and generates an image of a subject, encodes data of the image, and records the data on a recording medium.

The image capture apparatus 960 includes an optical block 961, an image capture unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected to the image capture unit 962. The image capture unit 962 is connected to the signal processing unit 963. The display unit 965 is connected to the image processing unit 964. The user interface 971 is connected to the control unit 970. The bus 972 connects the image processing unit 964, the external interface 966, the memory 967, the medium drive 968, the OSD 969, and the control unit 970 to one another.

The optical block 961 includes a focus lens and an aperture mechanism. The optical block 961 forms an optical image of a subject on an image capture surface of the image capture unit 962. The image capture unit 962 includes an image sensor, such as a CCD or a CMOS sensor, and converts the optical image formed on the image capture surface to an image signal as an electric signal using photoelectric conversion. Then, the image capture unit 962 outputs the image signal to the signal processing unit 963.

The signal processing unit 963 performs various camera signal processing operations, such as knee correction, gamma correction, and color correction, on the image signal received from the image capture unit 962. The signal processing unit 963 outputs the image data on which camera signal processing operations have been performed to the image processing unit 964.

The image processing unit 964 encodes the image data received from the signal processing unit 963 to generate encoded data. Then, the image processing unit 964 outputs the generated encoded data to the external interface 966 or the medium drive 968. Also, the image processing unit 964 decodes encoded data received from the external interface 966 or the medium drive 968 to generate image data. Then, the image processing unit 964 outputs the generated image data to the display unit 965. The image processing unit 964 may output the image data received from the signal processing unit 963 to the display unit 965 to display an image. Also, the image processing unit 964 may superimpose the data for display obtained from the OSD 969 on an image to be output to the display unit 965.

The OSD 969 generates an image of a GUI, for example, a menu, button, or cursor, and outputs the generated image to the image processing unit 964.

The external interface 966 is configured as, for example, a USB input/output terminal. The external interface 966 connects the image capture apparatus 960 to a printer at the time of, for example, printing an image. Also, a drive is connected to the external interface 966 if necessary. For example, a removable medium such as a magnetic disk or an optical disc is loaded in the drive, and a program read out from the removable medium can be installed into the image capture apparatus 960. Furthermore, the external interface 966 may be configured as a network interface connected to a network, such as a local area network (LAN) or the Internet. That is, the external interface 966 functions as a communication unit in the image capture apparatus 960.

The recording medium loaded in the medium drive 968 may be a readable/writable removable medium, such as a magnetic disk, a magneto-optical disk, an optical disc, or a semiconductor memory. Alternatively, a recording medium may be loaded in the medium drive 968 in a fixed manner, so that a non-portable storage unit, such as a built-in hard disk drive or a solid state drive (SSD), may be configured.

The control unit 970 includes a processor such as a CPU and a memory such as a RAM and a ROM. The memory stores a program executed by the CPU and program data. The program stored in the memory is, for example, read and executed by the CPU at the startup of the image capture apparatus 960. The CPU executes the program, and thereby controls the operation of the image capture apparatus 960 in response to, for example, an operation signal received from the user interface 971.

The user interface 971 is connected to the control unit 970. The user interface 971 includes, for example, a button and a switch used by a user to operate the image capture apparatus 960. The user interface 971 detects an operation performed by the user via these elements to generate an operation signal, and outputs the generated operation signal to the control unit 970.

In the image capture apparatus 960 having the above-described configuration, the image processing unit 964 has the function of the image processing apparatus 100 or 200. Thus, in the case of recording or reproducing an image in the image capture apparatus 960, subjective image quality can be increased by enhancing a stereoscopic effect.

5. Conclusion

Two embodiments and their application examples of the technology according to the present disclosure have been described in detail with reference to FIGS. 1 to 14. According to the above-described embodiments, depth information representing depths in individual pixels of an input image is modified in accordance with a determination result about the content of the input image, and a stereoscopic effect enhancement process for enhancing the stereoscopic effect of the input image is performed by using the modified depth information. Thus, the stereoscopic effect of image content can be enhanced in view of the perception of the stereoscopic effect that may depend on the content of the image. For example, according to the technique using the stereoscopic method suggested in Japanese Unexamined Patent Application Publication No. 2010-206362, depth information representing the distance between a camera and a subject can be obtained. However, such depth information does not increase a depth though it reproduces a depth to some extent. On the other hand, according to the above-described embodiments, a depth is increased in accordance with the content of an image. That is, for example, the extent of a landscape is emphasized in a landscape image, or an immersive sense of being in a building is emphasized in an image of the inside of the building. As a result, subjective image quality of image content experienced by a user can be effectively increased.

According to the above-described embodiments, the type of scene of an input image is determined, and depth information is modified in accordance with the determined type of scene. Accordingly, depth information can be modified using views regarding perception of a stereoscopic effect experienced for each type of scenes, and a stereoscopic effect can be appropriately enhanced.

According to the above-described embodiments, a face region, a region forming a target object, and an edge region or texture region in an input image are determined, and the depths of these regions are modified. Thus, a stereoscopic effect can be selectively enhanced or reduced in units of regions.

According to the above-described embodiments, the stereoscopic effect of an image is enhanced by using a visual characteristic related to the atmospheric perspective method. Accordingly, a stereoscopic effect can be subjectively enhanced without imposing much physical burden on a user, unlike in the method of enhancing binocular parallax.

A series of control processes performed by the individual apparatuses described in this specification may be realized by using any of software, hardware, and a combination of software and hardware. Programs constituting software are stored in advance, for example, in a storage medium provided inside or outside each apparatus. Each of the programs is read into a RAM at the time of execution and is executed by a processor such as a CPU.

The function of the image processing apparatus 100 or 200 may be loaded in a cloud computing environment. In this case, a terminal apparatus which records or reproduces an image transmits a target image to be processed, which is obtained by an image obtaining unit, to an apparatus having a function equivalent to that of the image processing apparatus 100 or 200 via a communication unit, and receives the target image whose stereoscopic effect has been enhanced by the apparatus. Such a terminal apparatus and the image processing apparatus 100 or 200 may constitute an image processing system.

Embodiments of the present disclosure have been described with reference to the attached drawings. The technical scope of the present disclosure is not limited to the embodiments described above. It is obvious that those skilled in the art of the present disclosure can achieve various alterations or modifications within the technical spirit described in the appended claims, and it is understood that these alterations or modifications are of course included in the technical scope of the present disclosure.

The present disclosure contains subject matter related to that disclosed in Japanese Priority Patent Application JP 2012-014488 filed in the Japan Patent Office on Jan. 26, 2012, the entire contents of which are hereby incorporated by reference.

What is claimed is:

1. An image processing apparatus comprising:
one or more processors configured to:
modify depth information representing depths in individual pixels of an image in accordance with content included in the image, thereby generating modified depth information;
perform a stereoscopic effect enhancement process of enhancing a stereoscopic effect of the image by using the modified depth information; and
classify each of the individual pixels of the image into one of a plurality of classes in accordance with a pattern of pixel values of one or more sets of the individual pixels and the modified depth information.

2. The image processing apparatus according to claim 1, wherein the one or more processors are further configured to:
determine the content included in the image.

3. The image processing apparatus according to claim 1, wherein the one or more processors are configured to determine a type of scene of the image, and
wherein the depth information is modified in accordance with the determined type of scene.

4. The image processing apparatus according to claim 3, wherein the one or more processors are configured to modify the depth information by combining the depth information and subsidiary depth information which is predefined for each type of scene.

5. The image processing apparatus according to claim 1, wherein the one or more processors are configured to:
determine a face region of a person in the image, and
modify a depth of the determined face region.

6. The image processing apparatus according to claim 1, wherein the one or more processors are configured to:
determine a region forming a target object in the image, and
modify a depth of the determined region forming the target object.

7. The image processing apparatus according to claim 1, wherein the one or more processors are configured to:
determine an edge and texture in the image, and
modify a depth of a region forming the determined edge or a region forming the determined texture.

8. The image processing apparatus according to claim 1, wherein the one or more processors are configured to enhance the stereoscopic effect of the image by using a visual characteristic related to an atmospheric perspective method.

9. The image processing apparatus according to claim 1, wherein the one or more processors are configured to enhance the stereoscopic effect of the image so that at least one of parameters including contrast, sharpness, brightness, saturation, and resolution increases for a pixel having a smaller depth represented by the modified depth information.

10. The image processing apparatus according to claim 1, wherein the one or more processors are configured to enhance the stereoscopic effect of the image so that at least one of parameters including contrast, sharpness, brightness, saturation, and resolution decreases for a pixel having a larger depth represented by the modified depth information.

11. The image processing apparatus according to claim 1, wherein the one or more processors are configured to enhance the stereoscopic effect of the image by performing filtering on the image by using a filter coefficient which is determined in accordance with a depth in a preliminary learning process.

12. The image processing apparatus according to claim 1, wherein the one or more processors are configured to:
perform filtering on a filter tap including a pixel and surrounding pixels of the individual pixels by using a filter coefficient, which is determined for each of the plurality of classes in accordance with a depth in a preliminary learning process.

13. The image processing apparatus according to claim 12, wherein the filter coefficient is determined for each of the plurality of classes in the preliminary learning process which is performed by using a plurality of sets,
wherein each of the plurality of sets includes a student image and a teacher image corresponding to the student image, the teacher image having a stereoscopic effect enhanced by using a visual characteristic related to an atmospheric perspective method.

14. The image processing apparatus according to claim 1, wherein the image corresponds to one or both of a right-eye image and a left-eye image constituting a stereoscopic image, and
wherein the image processing apparatus reproduces the stereoscopic image by causing a display device to display the right-eye image and the left-eye image which include the image having the enhanced stereoscopic effect.

15. An image processing method comprising:
in an information processing device comprising one or more processors:
modifying depth information representing depths in individual pixels of an image in accordance with content included in the image, thereby generating modified depth information;
performing a stereoscopic effect enhancement process of enhancing a stereoscopic effect of the image by using the modified depth information; and
classifying each of the individual pixels into one of a plurality of classes in accordance with a pattern of pixel values of one or more sets of the individual pixels and a depth represented by the modified depth information.

* * * * *